(12) United States Patent
Chonde et al.

(10) Patent No.: US 6,787,580 B2
(45) Date of Patent: Sep. 7, 2004

(54) WATER-FREE PREPARATION PROCESS FOR MULTIMODAL THERMOPLASTIC POLYMER FOAM AND FOAM THEREFROM

(75) Inventors: Yohannes Chonde, Midland, MI (US); Daniel Imeokparia, Midland, MI (US); John B. Horstman, Midland, MI (US); Robert A. Kirchhoff, Midland, MI (US); Kyung W. Suh, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 281 days.

(21) Appl. No.: 09/966,632

(22) Filed: Sep. 28, 2001

(65) Prior Publication Data

US 2002/0077378 A1 Jun. 20, 2002

Related U.S. Application Data

(60) Provisional application No. 60/242,864, filed on Oct. 24, 2000.

(51) Int. Cl.[7] .................................................. C08J 9/00
(52) U.S. Cl. ............................ 521/60; 521/62; 521/82; 521/83; 521/86; 521/88; 521/97; 521/98; 521/99; 521/100; 521/110; 521/112; 521/114; 521/116; 521/122; 521/130; 521/131; 521/134; 521/138; 521/139; 521/143; 521/146; 521/147; 521/149; 521/155; 521/170
(58) Field of Search ............................... 521/60, 62, 82, 521/83, 86, 88, 97, 98, 99, 100, 110, 112, 114, 116, 122, 130, 131, 134, 138, 139, 143, 146, 147, 149, 155, 170

(56) References Cited

U.S. PATENT DOCUMENTS

| | | |
|---|---|---|
| 4,214,054 A | 7/1980 | Watanabe et al. |
| 4,217,319 A | 8/1980 | Komori |
| 4,323,528 A | 4/1982 | Collins |
| 4,455,272 A | 6/1984 | Schubert et al. |
| 4,559,367 A | 12/1985 | Hurps et al. |
| 4,755,408 A | 7/1988 | Noel |
| 4,990,542 A | 2/1991 | Motani et al. |
| 5,064,874 A | 11/1991 | Motani et al. |
| 5,210,105 A | 5/1993 | Paquet et al. |
| 5,240,968 A | 8/1993 | Paquet et al. |
| 5,332,761 A | 7/1994 | Paquet et al. |
| 5,340,844 A | 8/1994 | Welsh et al. |
| 5,369,137 A | 11/1994 | Paquet et al. |
| 5,389,694 A | 2/1995 | Vo et al. |
| 5,422,378 A | 6/1995 | Vo |
| 5,698,144 A | 12/1997 | Wilkes et al. |
| 5,710,186 A * | 1/1998 | Chaudhary .................. 521/60 |
| 5,817,705 A | 10/1998 | Wilkes et al. |
| 5,886,061 A | 3/1999 | Beckman |
| 5,993,706 A | 11/1999 | Wilkes et al. |
| 5,993,707 A | 11/1999 | Chaudhary et al. |
| 5,994,420 A | 11/1999 | Gusavage et al. |
| 6,103,255 A | 8/2000 | Levene et al. |

FOREIGN PATENT DOCUMENTS

| | | |
|---|---|---|
| EP | 0 353 701 | 4/1997 |
| EP | 0 909 782 | 4/1999 |
| JP | 5032813 A2 | 2/1993 |
| JP | 5032815 A2 | 2/1993 |
| JP | 91 24827 A2 | 5/1997 |
| WO | WO 97/22656 | 6/1997 |

* cited by examiner

*Primary Examiner*—John M. Cooney, Jr.
(74) *Attorney, Agent, or Firm*—Steven W. Mork

(57) ABSTRACT

Prepare a multimodal thermoplastic polymer foam having a distribution of large and small cells in a substantial absence of water by using a blowing agent stabilizer. Multimodal foams of the present invention have blowing agent stabilizer predominantly located proximate to large cells. The resulting multimodal foams have particular utility as thermal insulating materials.

14 Claims, 2 Drawing Sheets

US 6,787,580 B2

WATER-FREE PREPARATION PROCESS FOR MULTIMODAL THERMOPLASTIC POLYMER FOAM AND FOAM THEREFROM

CROSS REFERENCE STATEMENT

This application claims the benefit of U.S. Provisional Application No. 60/242,864, filed Oct. 24, 2000.

BACKGROUND OF THE INVENTION

1. Field of the Invention

The present invention relates to a thermoplastic polymer foam having a multimodal cell size distribution and a water-free process for preparing said foam.

2. Description of Related Art

A foam having a multimodal cell size distribution (multimodal foam) offers performance advantages, such as greater toughness and enhanced insulating capability, over a conventional foam of the same polymer composition but having a generally uniform cell size distribution. A foam having a bimodal cell size distribution (bimodal foam) is one type of multimodal foam.

Current processes for producing multimodal foams expand a foamable polymer composition containing water. Water tends to produce corrosive acid when it reacts with halogenated fire retardants. The corrosive acid is undesirable because it can corrode process equipment. Therefore, a process for preparing a multimodal foam that does not require water is desirable. A water-free process that uses an environmentally friendly blowing agent is even more desirable.

SUMMARY OF THE INVENTION

In a first aspect, the present invention is a process for producing multimodal thermoplastic polymer foam comprising the following sequential steps: (a) dispersing a blowing agent stabilizer and a blowing agent into a heat plasticized thermoplastic polymer resin at an initial pressure to form a foamable composition; and (b) expanding said foamable polymer composition in a substantial absence of water and at a pressure less than said initial pressure to produce a multimodal thermoplastic foam. A preferred embodiment further comprises cooling the foamable composition between steps (a) and (b) and wherein step (a) further comprises applying shear to form the foamable composition. Blowing agent stabilizer is desirably present at a concentration of one to 50 weight-percent relative to polymer resin weight.

A second aspect of the present invention is a thermoplastic polymer foam comprising a thermoplastic polymer resin having large and small cells defined therein and a blowing agent stabilizer predominantly located proximate to the large cells. Desirably, the foam contains one to 50 weight-percent of a blowing agent stabilizer relative to thermoplastic polymer resin weight.

A third aspect of the present invention is an article of manufacture comprising the thermoplastic polymer foam of the second aspect. Preferably, said article is thermally insulating.

Foams of the present invention have utility as acoustical modulators, thermal insulation, and absorbent materials.

BRIEF DESCRIPTION OF DRAWINGS

Figure (FIG) 1 (one) is a SEM image of Example (Ex) 3, a multimodal polystyrene foam of the present invention prepared with a continuous process.

DETAILED DESCRIPTION OF THE INVENTION

Figure 1:
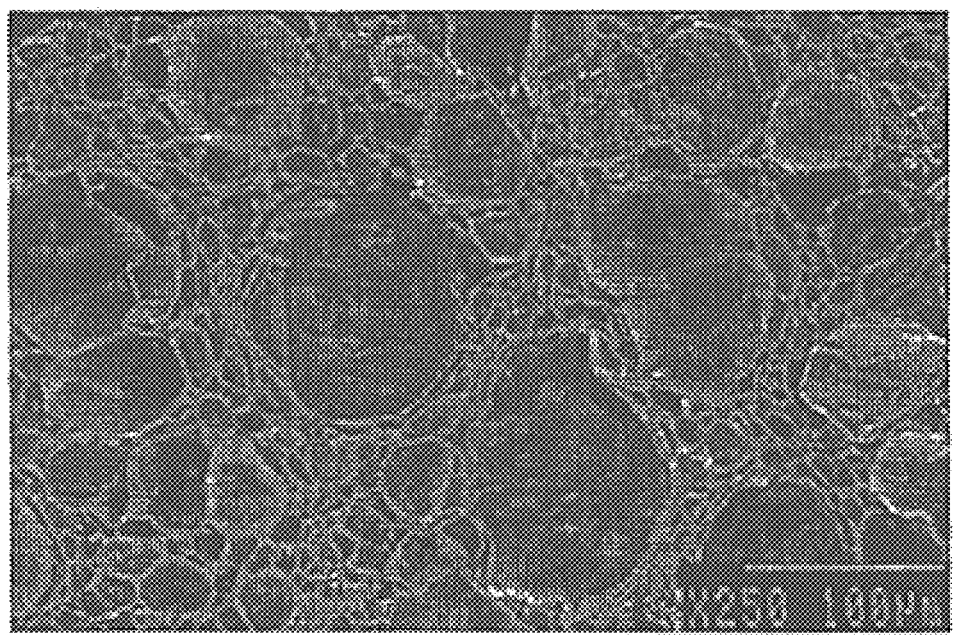

A "multimodal foam" is a foam having a multimodal cell size distribution. A foam has a multimodal cell size distribution if a plot of representative cross-sectional area versus cell size has two or more peaks. A "representative cross-sectional area" is a product of a number of cells of a given size and the cell's cross-sectional area. A representative cross-sectional area corresponds to how much surface area of the SEM image cells of a given size occupy. Cell size refers to cell diameter and the two terms are interchangeable herein.

Use a scanning electron microscope (SEM) image of a cross section of a foam to collect cell diameter and representative cross-sectional area data for the foam. The SEM image should be of a sufficient magnification so as to present a representative distribution of the cell sizes in the foam. Measure a cell diameter for each cell in the SEM image. Do not consider faults such as "blow-holes" as cells. Blow holes are spaces defined within a foam that penetrate through multiple cell walls and cell struts and have a plurality of cell wall and cell strut fragments remaining therein. A cell wall is a polymeric film between two cells. A cell strut is a polymeric domain where three or more cells meet.

Calculate cross-sectional surface area for each cell by assuming a circular cross-section. Therefore, estimate an appropriate diameter for non-circular cell cross-sections that will produce an appropriate cross-sectional surface area (e.g., for oval shaped cells use a diameter mid-way between the largest and smallest diameter). Using the cell diameters, calculate a cross-sectional area for each cell by assuming each cell has a circular cross-section (cross-sectional surface area $=\pi(\text{diameter}/2)^2/2$). A convenient program for measuring cell diameters and calculating cross-sectional areas of a digitally scanned image is United States' National Institutes of Health (NIH) public domain NIH IMAGE software (available on the Internet at http://rsb.info.nih.gov/nih-image/). Calculate representative cross-sectional area by multiplying the cross-sectional surface area for a cell of a given size by the number of cells of that size in a SEM image. Measure cell sizes in microns and round to two significant figures.

Prepare a plot with cell size along the x-axis and representative surface area on the y-axis. Cells comprising a peak ("small peak") corresponding to the smallest cell size(s) are "small cells". Cells comprising a peak ("large peak") corresponding the largest cell size(s) are "large cells". "Intermediate cells" comprise "intermediate peaks" in between a small peak and a large peak. Similarly, when a small peak and a large peak partially overlap, cells comprising the overlapping region are intermediate cells. Intermediate cells may have properties similar to large cells, small cells, or properties some combination of large and small cells. A "peak" is a point on a plot that has at least one point having a lower y-axis value both prior to and after it, progressing along the plot's x-axis, before there is a point having a higher y-axis value. A peak can comprise more than one point of equal y-axis values (a plateau), provided the point on either side of the plateau (progressing along the plot's x-axis) has a lower y-axis value than the points comprising the plateau.

Thermoplastic polymer resins suitable for use in the process and foams of the present invention include any extrudable polymer (including copolymers) including semi-crystalline, amorphous, and ionomeric polymers and blends thereof. Suitable semi-crystalline thermoplastic polymers include polyethylene (PE), such as high-density polyethylene (HDPE), low-density polyethylene (LDPE) and linear low-density polyethylene (LLDPE); polyesters such as polyethylene terephthalate (PET); polypropylene (PP); polylactic acid (PLA); syndiotactic polystyrene (SPS); ethylene/styrene copolymers (also known as ethylene/styrene interpolymers), ethylene/octene copolymers, and ethylene/propylene copolymers. Suitable amorphous polymers include polystyrene (PS), polycarbonate (PC), thermoplastic polyurethanes (TPU), polyacrylates (e.g., polymethylmethacrylate), and polyether sulfone. Preferred thermoplastic polymers include PS, PP, PE, PC and PET. The thermoplastic polymers may be lightly crosslinked, meaning they have between 5 and 25 percent (%) gel according to ASTM method D2765-84.

Prepare thermoplastic polymer foams of the present invention in a substantial absence of water. Fabrication of thermoplastic polymer foam of the present invention can also occur in a substantial absence of alcohols, particularly alcohols containing one to four carbons ($C_1$ to $C_4$ alcohols). "Substantial absence" means less than 0.5 wt %, preferably less than 0.4 wt %, more preferably less than 0.3 wt %, still more preferably less than 0.2 wt %, even more preferably less than 0.1 wt %, most preferably less than 0.05 wt %. Measure wt % relative to polymer resin weight.

Blowing agents include any conventional blowing agent used in foaming technology, with the exception of water. Suitable blowing agents include hydrofluocarbons such as methyl fluoride, difluoromethane (HFC-32), perfluoromethane, ethyl fluoride (HFC-161), 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a), pentafluoroethane (HFC-125), perfluoroethane, 2,2-difluoropropane (HFC-272fb), 1,1,1-trifluoropropane (HFC-263fb), and 1,1,1,2,3,3,3-heptafluoropropane (HFC-227ea); inorganic gases such as argon, nitrogen, and air; organic blowing agents such as hydrocarbons having from one to nine carbons ($C_1$–$C_9$) including methane, ethane, propane, n-butane, isobutane, n-pentane, isopentane, neopentane, cyclobutane, and cyclopentane; fully and partially halogenated aliphatic hydrocarbons having from one to four carbons ($C_1$–$C_4$); carbonyl containing compounds such as acetone, 2-butanone, and acetaldehyde. Suitable chemical blowing agents include azodicarbonamide, azodiisobutyronitrile, benzenesulfohydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine and sodium bicarbonate. A preferred blowing agent is selected from a group consisting of environmentally friendly (i.e., non-ozone depleting) blowing agents consisting of carbon dioxide ($CO_2$), hydrocarbons, and hydrofluorocarbons.

"Blowing agent stabilizers" are compounds, or combinations of compounds, that form a second phase of dispersed discrete domains in a thermoplastic polymer resin and that have an affinity for a blowing agent such that the blowing agent preferentially concentrates into or around those domains. A blowing agent stabilizer that concentrates a specific blowing agent is a blowing agent stabilizer for that blowing agent. Preferably, the blowing agent stabilizer is a blowing agent stabilizer for $CO_2$. The dispersed discrete domains contain multiple molecules of blowing agent stabilizer. The dispersed domains may form at any point prior to expanding a foamable polymer composition into a multimodal thermoplastic polymer foam and need not be present immediately upon dispersing into a thermoplastic polymer resin. For example, blowing agent stabilizer may be sufficiently soluble in a thermoplastic polymer resin so as to dissolve in the resin until cooled prior to expanding or until dispersing a specific blowing agent that complexes with the blowing agent stabilizer.

Dispersed blowing agent stabilizer domains concentrate blowing agent molecules, presumably by imbibing and/or adsorbing the molecules. The blowing agent stabilizer domains need not concentrate all of the blowing agent molecules and may preferentially concentrate the molecules of one blowing agent over another when more than one blowing agent is used. Preferably, the blowing agent stabilizer has negligible plasticizing affect on the thermoplastic polymer resin at the concentrations used. Suitable blowing agent stabilizers contain functionalities that are compatible with at least one blowing agent. For example, nitrogen, oxygen, silicon and fluorine functionalities are typically compatible with a $CO_2$ blowing agent.

A blowing agent stabilizer can affect foam formation in at least two ways. First, the stabilizer creates domains in the thermoplastic polymer resin that become concentrated with blowing agent. Presumably, these domains of concentrated blowing agent produce large cells in a foam while blowing agent molecules not associated with a blowing agent stabilizer domain remain dissolved or dispersed in the thermoplastic polymer resin and produce small cells in a foam.

Blowing agent stabilizers can also increase the amount of blowing agent dispersible in a thermoplastic polymer resin above a blowing agent solubility limit for that thermoplastic polymer resin in the absence of the stabilizer. Therefore, the blowing agent stabilizer allows one to obtain a multimodal, preferably a bimodal foam that is lower in density than an analogous foam prepared in the absence of blowing agent stabilizer. An "analogous foam" is a foam prepared with an identical formulation and under identical conditions as another foam except for any stated differences. Foams of the present invention generally have a density of 0.5 to 50 pounds-per-cubic-foot (pcf), or 8.0 to 800 kilograms-per-cubic-meter ($kg/m^3$).

Suitable blowing agent stabilizers include non-plasticizing polyalkylene-oxide polymers and copolymers including polyethylene glycol (PEG), PEG ethers, polyethylene oxide grafted polystyrene/maleic anhydride (PS/MAH) random copolymers, and ethylene glycol grafted polyurethane random copolymers; non-plasticizing polydimethylsiloxane (PDMS) and non-plasticizing functionalized PDMS including hydroxyl and amine functionalized PDMS; and PS/MAH random copolymers. A blowing agent stabilizer is "non-plasticizing" if it does not significantly lower a polymer composition's glass transition temperature ($T_g$) when dispersed in the polymer composition at a concentration suitable for use in this invention. Bear in mind that a compound that is plasticizing in one polymer composition may not be in another composition. Therefore, an artisan must evaluate whether particular polyalkylene-oxide polymers and copolymers, PDMS, and functionalized PDMS are plasticizing in a polymer composition of interest or not. Determine $T_g$ using American Society for Testing and Materials (ASTM) method D-3418. Generally non-plasticizing PDMS and functionalized PDMS blowing agent stabilizers have a weight-average molecular weight of 60,000 or more.

Blowing agent stabilizers can have pendant hydrophilic functionalities such as hydroxyl groups, or may be free of such functionalities. It is conceivable that hydrophilic functionalities on a blowing agent stabilizer detrimentally bind sufficient water molecules so that a foamable composition containing that blowing agent stabilizer is no longer essentially free of water. In such a situation, dry the blowing agent stabilizer prior to use.

One preferred blowing agent stabilizer is a block copolymer wherein at least one block is more compatible with the blowing agent than with the thermoplastic polymer resin and at least one other block is more compatible with the thermoplastic polymer resin than with the blowing agent. Such block copolymers include A-B and A-B-A type block copolymers. The composition of each block will depend on the blowing agent and thermoplastic polymer resin. For example, preferred blowing agent stabilizers when using a $CO_2$ blowing agent and polystyrene resin include A-B type copolymers such as, for example, polystyrene/poly (dimethyl)siloxane block copolymers and polystyrene/polyoxyethylene block copolymers. A-B-A type copolymers for systems having a $CO_2$ blowing agent and polystyrene resin include, for example, poly(meth)acrylate/polysiloxane/poly(meth)acrylate block copolymers such as polybutylmethacrylate/polysiloxane/polybutylmethacrylate. In each of the above three examples, the polystyrene or polybutylmethacrylate blocks are resin-compatible and the polydimethylsiloxane or polyoxyethylene blocks are $CO_2$ compatible. Preferred blowing agent stabilizers for systems using a $CO_2$ blowing agent and polypropylene resin include polypropylene/polydimethylsiloxane block copolymers and polypropylene/polyoxyethylene block copolymers. A skilled artisan can determine suitable blocks for various resins and blowing agents without undue experimentation.

The amount of blowing agent stabilizer used in the process of the present invention and in multimodal foams of the present invention depends on the thermoplastic polymer resin, stabilizer, blowing agent, and properties desired for the multimodal foam. Generally the amount of stabilizer is one wt % or more, preferably 2 wt % or more, more preferably 3 wt % or more, still more preferably 4 wt % or more, even more preferably 5 wt % or more based on polymer resin weight. Generally, stabilizer concentration is 50 wt %, preferably 30 wt % or less, more preferably 20 wt % or less, still more preferably 10 wt % or less, based on polymer resin weight. Stabilizer amounts less than one wt %, based on polymer resin weight, tend to produce more uniformly sized cells than desired. Stabilizer amounts above 50 wt %, based on polymer resin weight, can produce a foam having a multimodal cell size distribution but foam properties such as density as well as processing costs tend to suffer. Stabilizer concentrations are typically less than 30 wt %, based on polymer resin weight, unless the blowing agent stabilizer is a thermoplastic polymer resin itself, such as a modified polyurethane copolymer. An artisan can realize that some blowing agent stabilizers are more efficient than others in forming multimodal foams. For example, polyglycols and polyglycol ethers are desirably present at a concentration greater than 3 wt %, more desirably greater than 5 wt % based on thermoplastic polymer resin while block copolymers, for instance, can be equally effect at lower concentrations.

Optionally, the process includes adding at least one additional additive to the thermoplastic polymer resin. Additional additives include flame retardant materials such as aluminum trihydrate ($Al(OH)_3$), magnesium hydroxide ($Mg(OH)_2$), borates, phosphates, intumescent combinations including melamine salts with pentaerythritol acid phosphate, organic halides (such as chlorinated paraffin, hexabromocyclododecane, and decabromodiphenyl oxide), and combinations thereof. Further examples of suitable additional additives include thermal insulation enhancing additives such as carbon black (coated and non-coated), graphite, aluminum, gold, and titanium dioxide; acoustical insulation enhancing additives such as lead and blends of high and low density fillers; nucleating agents such as talc, magnesium oxide, calcium carbonate, calcium silicate, zeolite, stearic acid, calcium stearate, and polytetrafluoroethylene powder; permeation modifying additives such as partial esters of fatty acids containing 8 to 20 carbons atoms and a polyhydric alcohol containing 3 to 6 hydroxyl groups as described in U.S. Pat. No. (USP) 4,217,319 (column 2, lines 20–30; incorporated herein by reference), higher alkyl amines and nitrogen-substituted derivatives thereof as described, for example, in U.S. Pat. No. 4,214,054 (column 3, line 49 through column 4, line 61; incorporated herein by reference), saturated fatty acid amides and derivatives thereof as described, for example, in U.S. Pat. No. 4,214,054 (column 4, line 62 through column 5, line 35; incorporated herein by reference), complete esters of saturated higher fatty acids as described, for example, in U.S. Pat. No. 4,214,054 (column 5, line 36 through column 6 line 3; incorporated herein by reference); extrusion aiding additives such as calcium stearate, barium stearate, and stearic acid; and pigments such as cyan blue and indigo.

Dispersing aids that facilitate dispersing blowing agent stabilizer into a thermoplastic resin are also suitable for use in the present invention. Preferred dispersing aids include block copolymers containing one polymer block compatible with the thermoplastic polymer resin and one polymer block compatible with the blowing agent stabilizer. For example, a styrene/propylene block copolymer can act as a dispersing aid to facilitate dispersing a styrene based blowing agent stabilizer into a polypropylene-based resin.

In general, prepare thermoplastic polymer foams of the present invention in a continuous process by sequentially: (a) dispersing a blowing agent and a blowing agent stabilizer for the blowing agent into a plasticized thermoplastic polymer resin at an initial pressure and under sufficient shear to form a foamable polymer composition; (b) cooling the foamable polymer composition; and (c) expanding the foamable polymer composition in a substantial absence of water and at pressure less than the initial pressure to produce a multimodal thermoplastic polymer foam. Expanding the foamable polymer composition in step (c) can also be in the substantial absence of alcohols. The process of the present invention preferably uses heat to plasticize the thermoplastic polymer resin into a polymer composition to facilitate dispersing blowing agent and blowing agent stabilizer. Many suitable sources of heat are available including steam, infrared radiation, sonicators, heating mantles, electric heating elements, and friction. Generally, the initial pressure is greater than atmospheric pressure (101 kilopascals absolute). Sufficient shear corresponds to enough shear to disperse the blowing agent and blowing agent stabilizer into the polymer resin.

Dispersion of blowing agent stabilizer, blowing agent, and additional additives into a thermoplastic polymer resin can occur before, during or after plasticizing the thermoplastic polymer resin. Preferably, addition of the blowing agent stabilizer and any optional additives, and plasticizing of the resin occurs in a single extruder. The blowing agent stabilizer and additives can enter the extruder simultaneously with the resin, subsequent to the resin, or a combination thereof. Mixing of the blowing agent stabilizer and/or an additive with the resin can also occur prior to the extruder. For example, additives, particularly the blowing agent stabilizer, can take the form of microdispersed particles dispersed within a polymer resin during polymerization of the polymer resin and prior to extruding in a foam process.

Blowing agent addition preferably occurs in a blowing agent mixer. The blowing agent mixer disperses the blowing agent into the polymer composition. The blowing agent mixer can be part of the extruder or a device separate from the extruder. Suitable blowing agent mixers include gear mixers, static mixers, and high shear roto-stator mixers. Blowing agent addition typically occurs at a pressure greater than 500 (pounds-per-square-inch (psi) (3.4 megapascals (MPa)), more typically greater than 1200 psi (8.3 MPa), still more typically greater than 1500 psi (10.3 MPa); and typically at a pressure less than 6000 psi (41.4 MPa), preferably less than 5000 psi (34.5 MPa), more preferably less than 4000 psi (27.6 MPa). The resin, at the point of blowing agent addition, is typically at a temperature of at least 100 degrees Celsius (°C.), more typically at least 150° C., still more typically at least 180° C.; and typically less than 400° C., preferably less than 300° C.

Cooling a foamable composition occurs in a heat exchanger where the foamable composition cools to a desired foaming temperature. Suitable heat exchangers include commercially available heat exchangers commonly used in preparing extruded thermoplastic polymer foam. The foaming temperature influences whether the final foam is open-or close-celled. The foam of the present invention can be either open-or close-celled. Open-celled foam contains at least 20% open cell content while close-celled foam contains less than 20% open cell content. Measure open cell content according to ASTM method D-6226. Open-celled foam typically forms at higher foaming temperatures than close-celled foam. Additives can also affect how open the foam structure is. For example, inclusion of plasticizing additives in the resin tends to cause open-celled structures at lower temperatures. The desired foaming temperature, then, depends upon whether one wants an open-or close-celled structure, and the particular resin, stabilizer, and additive combination.

Foaming temperatures depend on the melting temperature or glass transition temperature of the resin used. Foaming temperatures are typically above 40° C., more typically above 80° C., and still more typically above 100° C. The foaming temperature for polystyrene is typically below 150° C. while the foaming temperature for polypropylene is typically below 180° C. A skilled artisan can determine an optimal foaming temperature for a given resin, stabilizer, and additive combination without undue experimentation.

Expanding a foamable polymer composition (foaming) typically occurs as a foamble polymer composition proceeds through a die, from an inside to an outside of an extruder. Pressure inside the extruder is higher than pressure outside the extruder. The pressure inside the extruder is typically higher than atmospheric pressure (14.7 psi-absolute, 760 millimeters of mercury) and less than 10,000 psi (69.0 MPa). Typically, the pressure outside the extruder is at atmospheric pressure, though pressures higher or lower than atmospheric pressure are suitable. Suitable dies include those routinely used in producing thermoplastic polymer foam.

The present invention includes continuous, batch, and semi-batch processes. An exemplary batch process comprises combining a polymer resin, blowing agent stabilizer and desired additives in a container, heating the container contents to a specified temperature or temperature range sufficient to plasticize the polymer resin, adding $CO_2$ to a specified pressure or pressure range, allowing the $CO_2$ to penetrate the resin over a period of time, and then rapidly relieving the pressure, and allowing the resin to expand into a foam. Extrusion, injection molding, blow molding and compression molding processes are all suitable for forming foams of the present invention. Preferably, the process is a continuous extrusion process. That is, the resin continually advances from a point at which it enters an extruder through to a point at which it extrudes out of a die and expands into a foam. Such a continuous process is in contrast to batch or semi-batch processes wherein the resin spends a specified period of time in a single process step without advancing.

U.S. Pat. No. 5,817,705 and U.S. Pat. No. 4,323,528 (incorporated herein by reference) disclose an alternative, but suitable foaming method using an "extruder-accumulator system". The extruder-accumulator system is an intermittent, rather than continuous, process. The extruder-accumulator system includes a holding zone or accumulator where a foamable composition remains under conditions that preclude foaming. The holding zone is equipped with an outlet die that opens into a zone having a lower pressure. The die has an orifice that may be open or closed, preferably by way of a gate that is external to the holding zone. Operation of the gate does not affect the foamable composition other than to allow it to flow through the die. Opening the gate and substantially concurrently applying mechanical pressure on the foamable composition by a mechanism (such as a mechanical ram) forces the foamable composition through the die into the zone of lower pressure. The mechanical pressure is sufficient to force the foamable composition through the die at a rate fast enough to preclude significant foaming within the die yet slow enough to minimize and preferably eliminate generation of irregularities in foam cross-sectional area or shape. As such, other than operating intermittently, the process and its resulting products closely resemble those made in a continuous extrusion process.

Foams of the present invention may be in the form of planks or sheets. Foam planks are generally 1.5 cm, or more, thick while foam sheets are generally less than 1.5 cm thick. Generally, prepare foam planks by extruding a foamable polymeric composition through a slit die and allow it to expand in the presence of a forming apparatus. Generally, prepare foam sheets by extruding a foamable polymeric composition through an annular die, allow it to expand over a mandrel, and slice a resulting foam tube lengthwise.

Foams of the present invention may be coalesced foams, comprising multiple coalesced, yet distinguishable, foam elements. Foam elements are foam structures that typically extend lengthwise in the foam. Foam elements are distinguishable from adjacent foam elements by a skin that surrounds each foam element. A skin is a polymer film or portion of a foam element that has a higher density than the foam element it surrounds. Foam elements can be strands, sheets, or combinations of strands and sheets. Sheets extend the full width or height of a coalesced polymer foam while strands extend less than the full width and height. Width and height are orthogonal dimensions mutually perpendicular to the length (extrusion direction) of a foam. Foam elements may be solid or hollow (see, for example, U.S. Pat. No. 4,755,408, incorporated herein by reference, for examples of hollow foam strands and structures thereof).

Preparing coalesced polymer foams typically involves extruding a foamable composition through a die defining multiple holes, such as orifices, slits, or a combination of orifices and slits. The foamable composition flows through the holes, forming multiple streams of foamable composition. Each stream expands into a foam member. Foam streams contact one another and their skins join together during expansion, thereby forming a coalesced polymer foam. "Strand foam" or "coalesced strand foam" is one type of coalesced polymer foam comprising multiple distinguishable foam strands, or profiles.

Foams of the present invention are multimodal, preferably bimodal. Blowing agent stabilizer concentration, the size distribution of blowing agent stabilizer, blowing agent composition, optional nucleating agent additive, as well as the type of nucleating agent(s) added all affect a foam's cell size distribution. Large cell size and large cell size polydispersity is generally a function of blowing agent stabilizer domain size and polydispersity. Decreasing blowing agent stabilizer domain size typically results in a decrease in large cell size, and vice versa. Uniform large cells tend to form when blowing agent stabilizer is uniformly dispersed throughout a polymer resin. In contrast, polydispersity of larger cells increases as stabilizer domain size polydispersity increases. Use of more than one type of blowing agent stabilizer and/or more than one type of blowing agent can also produce a foam with more than one size of large cell. Therefore, even intermediate cells can have blowing agent stabilizer around them. Use of more than one type of nucleating agent can produce a foam with more than one size of small cell, even to the extent of forming intermediate cells without having blowing agent stabilizer located proximate them. A skilled artisan can determine many ways to prepare a foam having a multimodal cell size distribution, including trimodal and tetramodal, using the present process.

A multimodal foam prepared by the process of the invention has blowing agent stabilizer located predominantly proximate to large cells. That is, blowing agent stabilizer is predominantly located around large cells as opposed to small cells. One can identify the location of blowing agent stabilizer in a foam using standard analytical techniques such as X-ray backscattering.

Multimodal foams, including bimodal foams, of the present invention have particular utility in thermally insulating articles since they often have higher insulating values (R-values) than analogous foams prepared in the absence of blowing agent stabilizer and having a generally uniform cell size distribution. The multimodal foams, including bimodal foams, of the present invention typically have an R-value of at least 0.2 degrees Fahrenheit-square foot-hour per British thermal unit-inch (° F·ft$^2$·h/Btu·in), or 1.4 Kelvin-meter per Watt (K·m/W), greater than an analogous foam prepared in the absence of blowing agent stabilizer. The foams of the present invention preferably have an R-value of at least 4.4 (30.5), preferably at least 4.5 (31.2), more preferably at least 4.6 (31.9), most preferably at least 4.7 (32.6) ° F·ft$^2$·h/Btu·in (K·m/W) as determined by ASTM method C-518-91.

The following examples illustrate, but do not limit, the invention. Parts-per-hundred (pph) are parts by weight relative to resin weight.

COMPARATIVE EXAMPLE (COMP EX) A AND EX 1–4

Prepare Comp Ex A and Ex 1–4 using a standard thermoplastic polymer foam extrusion system comprising, in series, an extruder, a mixer, a cooler, and an extrusion die. The extrusion rate is 50 pounds-per-hour (22.68 kilograms-per hour (kg/h)). The foam formulation consists of a $CO_2$ blowing agent (level as specified in Table 1), barium stearate (0.2 pph), hexabromocyclododecane flame retardant (2.7 pph), and polystyrene resin (F168 grade resin, from The Dow Chemical Company). Prepare all foams at a foaming temperature of 120° C. and in a substantial absence of water. Ex 1–4 further include a blowing agent stabilizer, as indicated in Table 1, selected from the list below (available from Goldshmidt Chemical Corporation):

(a) polybutylmethacrylate/polysiloxane/polybutylmethacrylate block copolymer (BSi-1025);

(b) polystyrene/polyethylene oxide block copolymer (SE-0720).

TABLE 1

| Comp Ex/Ex | $CO_2$ loading (pph) | Blowing Agent Stabilizer | Die Pressure psi (MPa) | Foam Density pcf (kg/m$^3$) | R-value ° F·ft$^2$·h/Btu·in (K·m/W) | K-factor Btu·in/h·ft$^2$·° F. (W/K·m) |
|---|---|---|---|---|---|---|
| A | 4.7 | (none) | 1100 (7.6) | 2.6 (42) | 4.29 (29.8) | 0.233 (0.034) |
| 1 | 4.7 | 4 pph (a) | 1400 (9.6) | 3.1 (50) | 4.43 (30.8) | 0.226 (0.033) |
| 2 | 4.7 | 4 pph (b) | 1400 (9.6) | 2.4 (39) | 4.46 (30.9) | 0.224 (0.032) |
| 3 | 5.8 | 2 pph (a) | 1500 (10) | 3.0 (48) | 4.74 (32.9) | 0.211 (0.030) |
| 4 | 6.0 | 4 pph (b) | 1500 (10) | 2.5 (40) | 4.54 (31.4) | 0.220 (0.032) |

Figure 2:
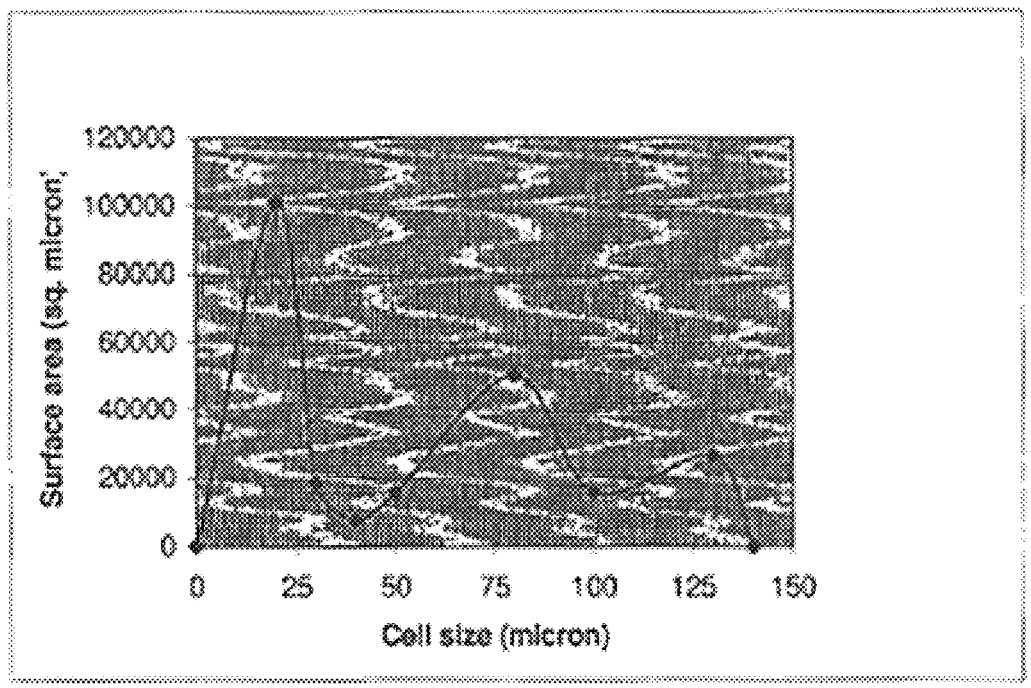
FIG. 2 is a plot of representative cross-sectional area versus cell size for Ex 3.

Comp Ex A has a generally uniform cell size distribution. In contrast, Ex 1–4 have a multimodal cell size distribution. For example, FIG. 1 presents an SEM image of Ex 3 revealing the multimodal cell size distribution. FIG. 2 presents a plot of representative cross-sectional surface area versus cell size for Ex 3 revealing a multimodal cell size distribution. A peak at approximately 20 microns corresponds to small cells. A peak at approximately 130 microns corresponds to large cells. A peak at approximately 80 microns corresponds to intermediate cells.

Table 1 includes R-values for Comp Ex A and Ex 1–4, as determined according to ASTM method C-518-91. Ex 1–4 each have higher R-values than Comp Ex A, demonstrating the better insulating ability of a multimodal foam relative to a foam having a generally uniform cell size distribution (Comp Ex A). Ex 3 and 4 further exemplify foams prepared with relatively high loadings of blowing agent (5.8–6 pph). Ex 3 has a similar density to Ex 1, yet Ex 3 has a higher R-value than Ex 1. Presumably, the different R-values result from different dispersity in the cell size distribution. The same is true in comparing Ex 4 and Ex 2.

Ex 1–4 further illustrate multimodal foams prepared in a substantial absence of water using an environmentally friendly blowing agent.

COMP EX B AND EX 5

Prepare the foams using an extrusion system comprising a twin screw extruder configured to provide mixing and cooling with an extrusion die attached at the extruder discharge. The system operates at an extrusion rate of 2.2 pounds per hour (1.0 kg/h). The foam formulations contain 4.3 pph $CO_2$ blowing agent, 5.26 pph carbon black (AROSPERSE® 7, trademark of J.M. Huber Corporation, or Raven™ 430, trademark of Columbian Chemical, carbon black), and polystyrene resin (same as Ex 1). Example 5 further contains 3.5 pph blowing agent stabilizer (a). Prepare both foams at a foaming temperature of 133° C. and a die pressure of 1600 psi (11 MPa). Comp Ex B has a density of 4.6 pcf (74 kg/m³) while Ex 5 has a density of 3.5 pcf (56 kg/m³).

Ex 5 has a multimodal cell size distribution while Comp Ex B has a largely uniform cell size distribution. Ex 5 is an example of a multimodal foam of the present invention that comprises carbon black filler and that is prepared in a substantial absence of water using an environmentally friendly blowing agent. Furthermore, Ex 5 demonstrates a multimodal foam having a lower density than an analogous foam prepared in the absence of a blowing agent stabilizer (Comp Ex B in this case).

COMP EX C AND EX 6–9

Prepare Comp Ex C and Ex 6–9 as described below. First, melt blend polystyrene resin (same as Ex 1) and the specified blowing agent stabilizer (see Table 2), then compression mold the blend into a bar approximately 1/16-inch (0.16-centimeter (cm)) thick, 1.5-inches (3.81-cm) long, and approximately 1-inch (2.54-cm) wide. Place the compression molded bar into a high temperature and pressure stainless steel reactor, heat the reactor and its contents to the foaming temperature (indicated in Table 2), purge the reactor with $CO_2$ gas, and add $CO_2$ blowing agent to a pressure of 3500 psi (24 MPa). Hold at the foaming temperature and 3500 psi (24 MPa) for 2 hours. Rapidly (within 1 second) depressurize the reactor, thereby allowing the sample to expand.

The blowing agent stabilizer is selected from (a), (b) and those specified below:

(c) polydimethysiloxane (30,000 centipoise 200 Fluid from Dow Corning);

(d) polypropylene carbonate (molecular weight of 50,000 gram/mol).

Foaming parameters and foams characteristics for Comp Ex C and Ex 6–9 are set forth in Table 2.

TABLE 2

| Comp Ex/Ex | Blowing Agent Stabilizer | Foaming Temperature (° C.) | Foam Density pcf (kg/m³) |
|---|---|---|---|
| C | (none) | 100 | 13.8 (221) |
| 6 | 10 pph (a) | 100 | 12.4 (199) |
| 7 | 10 pph (b) | 100 | 12.8 (205) |
| 8 | 10 pph (c) | 100 | 12.2 (195) |
| 9 | 30 pph (d) | 125 | 11.7 (187) |

Ex 6–9 have multimodal cell size distributions while Comp Ex C has a largely uniform cell size distribution. Ex 6–9 demonstrate four different blowing agent stabilizers. Furthermore, each of Ex 6–9 demonstrate a multimodal foam having a lower density than an analogous foam prepared in the absence of a blowing agent stabilizer (Comp Ex C in this case).

X-ray backscattering analysis of Ex 6 shows that the blowing agent stabilizer is located predominantly proximate to large cells. In this case, X-ray backscattering identifies silicon of the blowing agent stabilizer.

COMP EX D AND EX 10–12

Prepare Comp Ex D and Ex 10–12 by a process similar to that described for Comp Ex C and Ex 6–9, further including 5.3 pph carbon black (Arosperse 7). Maintain the foaming temperature at 100° C. Table 3 specifies the blowing agent stabilizer for each Ex and includes the following blowing agents:

(e) polystyrene/polyethylene oxide block copolymer (SE-1030; available from Goldshmidt Chemical Corporation)

(f) ultra high molecular weight PDMS masterbatch, 50% active in high impact polystyrene (MB50-004 from Dow Corning).

TABLE 3

| Comp Ex/Ex | Blowing Agent Stabilizer | Foam Density pcf (kg/m³) |
|---|---|---|
| D | (none) | 18.5 (296) |
| 10 | 10 pph (a) | 14.7 (235) |
| 11 | 10 pph (e) | 14.2 (228) |
| 12 | 5 pph (f) | 13.9 (222) |

Ex 10–12 have multimodal cell size distributions while Comp Ex D has a largely uniform cell size distribution. Ex 10–12 demonstrate three different blowing agent stabilizers of the present invention. Furthermore, Ex 10–12 demonstrate multimodal foams having a lower density than an analogous foam prepared in the absence of a blowing agent stabilizer (Comp Ex D in this case).

EX 13 AND 14

Prepare Ex 13 and 14 as described for Ex 6–9, using a foaming temperature of 100° C. The blowing agent stabilizer for each example is specified in Table 4, and is selected from the following:

(g) modified polyurethane copolymer (81 wt % polypentyldecalactone (2400 weight-averaged molecular weight)/16 wt % methylene diisocyanate/3 wt % butanediol)

(h) modified polyurethane copolymer (80 wt % polypentyldecalactone (2400 weight-averaged molecular weight)/5 wt % polyethylene oxide (200 weight-averaged molecular weight)/15 wt % methylene diisocyanate).

TABLE 4

| Ex | Blowing Agent Stabilizer | Foam Density pcf (kg/m³) |
|---|---|---|
| 13 | 11 pph (g) | 13.9 (223) |
| 14 | 43 pph (h) | 14.4 (231) |

Ex 13 and 14 are both multimodal foams prepared in a substantial absence of water using modified polyurethane copolymer blowing agent stabilizers.

EX 15 AND 16

Prepare Ex 15 and 16 using a batch process similar to that described for Ex 6–9 except (1) use polypropylene (PF814 resin, from Montell) instead of polystyrene, (2) use a 148° C. foaming temperature, and (3) use 2 pph blowing agent stabilizer (f) for Ex 15 and use 10 pph blowing agent stabilizer (i) for Ex 16. Blowing agent stabilizer (i) is:

(i) 20 wt % (a) and 80 wt % ethylene and acrylic acid copolymer (LOTRYL™ 35BA40 polymer, trademark of ELF Atochem).

Figure 3:
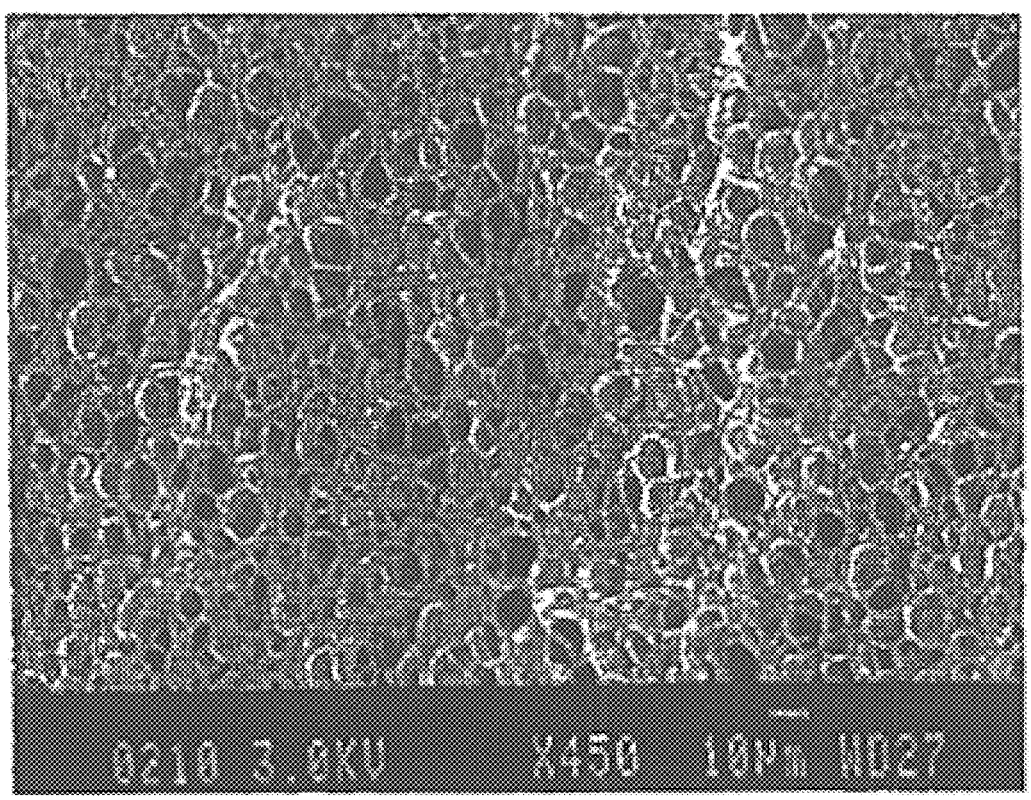
FIG. 3 is a SEM image of Ex 15, a multimodal polypropylene foam of the present invention prepared with a blowing agent stabilizer using a batch process.

Both Ex 15 and 16 are multimodal foams. Ex 15 illustrates a polypropylene foam prepared with blowing agent stabilizer and in a substantial absence of water, yet having a multimodal cell size distribution. Ex 15 has a density of 10.3 pcf (165 kg/m$^3$) FIG. 3 presents an SEM image of Ex 15 showing a multimodal cell size distribution.

Ex 16 is another example of a multimodal PP foam of the present invention prepared in a substantial absence of water that demonstrates the effectiveness of another blowing agent stabilizer composition. Ex 16 has a density of 14.4 pcf (231 kg/m$^3$).

EX 17 AND 18

Prepare Ex 17 and Ex 18 using an extrusion process similar to that of Ex 1–4 except use PP (PF814 resin) instead of PS resin and a 5.5 pph $CO_2$ loading. Use a mixture of hydroxyl-functionalized PDMS in PP homopolymer (MB50-321 masterbatch from Dow Corning, 50 wt % hydroxyl-functionalized PDMS by weight of masterbatch) as a blowing agent stabilizer. Additional parameters are in Table 5.

TABLE 5

| Comp Ex/Ex | Blowing Agent Stabilizer | Die Pressure psi (MPa) | Foam Density pcf (kg/m$^3$) |
|---|---|---|---|
| 17 | 4 pph | 955 (6.5) | 2.3 (37) |
| 18 | 2 pph | 980 (6.7) | 2.1 (34) |

Ex 17 and 18 are examples of extruded PP foams of the present invention prepared in a substantial absence of water using a hydroxyl-functionalized PDMS as a blowing agent stabilizer.

What is claimed is:

1. A thermoplastic polymer foam comprising a thermoplastic polymer resin having a multimodal cell size distribution, the multimodal cell size distribution being shown by a plot of representative cross-sectional area versus cell size that has two or more peaks, one of which corresponds to the smallest cell size(s) and represents small cells and another of which corresponds to the largest cell size(s) and represents large cells, and a blowing agent stabilizer, the blowing agent stabilizer being predominantly located proximate to the large cells.

2. The thermoplastic polymer foam of claim 1, wherein said foam contains one to 50 weight-percent of a blowing agent stabilizer relative to thermoplastic polymer resin weight.

3. The thermoplastic polymer foam of claim 1, wherein said foam has a bimodal cell size distribution.

4. The thermoplastic polymer foam of claim 1, wherein the blowing agent stabilizer is selected from a group consisting of non-plasticizing polyalkylene-oxide polymers and copolymers.

5. The thermoplastic polymer foam of claim 1, wherein the thermoplastic polymer resin is polystyrene and the blowing agent stabilizer is selected from a group consisting of polystyrene/polydimethylsiloxane block copolymers, polystyrene/polyoxyethylene block copolymers, polybutyl (meth) acrylate/polysiloxane/polybutyl (meth) acryl ate block copolymers, polyethylene oxide grafted polystyrene/maleic anhydride random copolymers, and ethylene glycol grafted polyurethane random copolymers.

6. The thermoplastic polymer foam of claim 1, wherein the thermoplastic polymer resin is polypropylene and the blowing agent stabilizer is selected from a group consisting of polypropylene/polydimethylsiloxane block copolymers and polypropylene/polyoxyethylene block copolymers.

7. The thermoplastic polymer foam of claim 1, further comprising a thermal insulating enhancing additive selected from a group consisting of carbon black (coated and non-coated) and graphite.

8. The thermoplastic polymer foam of claim 1, wherein said foam has an R-value of at least 4.4° F.·ft$^2$·h/Btu·in (30.5 K·m/W).

9. The thermoplastic polymer foam of claim 1, wherein said foam has an R-value at least 0.2° F.·ft$^2$·h/Btu·in (1.4 K·m/W) greater than an analogous foam prepared in the absence of blowing agent stabilizer.

10. The thermoplastic polymer foam of claim 1, wherein said foam has a density of 0.5 to 50 pounds per cubic foot (8.0 to 801 kilograms per cubic meter).

11. The thermoplastic polymer foam of claim 1, wherein said foam has a lower density than an analogous foam prepared in the absence of blowing agent stabilizer.

12. The thermoplastic polymer foam of claim 1, wherein said thermoplastic polymer is selected from a group consisting of polystyrene, syndiotactic polystyrene, polypropylene, polyethylene, ethylene/propylene copolymers, ethylene/styrene copolymers, polymethylmethacrylate, polyethylene terephthalate, polycarbonate, polylactic acid, thermoplastic polyurethane, and polyethersulfone.

13. An article of manufacture comprising the thermoplastic polymer foam of claim 1.

14. The article of manufacture of claim 13, wherein said article is thermally insulating.

* * * * *